United States Patent
Wilhelmsson et al.

(10) Patent No.: US 7,787,358 B2
(45) Date of Patent: *Aug. 31, 2010

(54) UPLINK INTER-CARRIER INTERFERENCE CANCELLATION OF OFDMA SYSTEMS

(75) Inventors: Leif Wilhelmsson, Dalby (SE); Andreas Nevalainen, Lund (SE); Jim Svensson, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 301 days.

This patent is subject to a terminal disclaimer.

(21) Appl. No.: 11/844,072

(22) Filed: Aug. 23, 2007

(65) Prior Publication Data
US 2008/0144486 A1   Jun. 19, 2008

Related U.S. Application Data (60) Provisional application No. 60/870,685, filed on Dec. 19, 2006.

(51) Int. Cl.
*H04J 11/00* (2006.01)

(52) U.S. Cl. .................. 370/208; 370/344; 375/260; 375/344

(58) Field of Classification Search .................. None
See application file for complete search history.

(56) References Cited

U.S. PATENT DOCUMENTS

| | | | |
|---|---|---|---|
| 7,120,209 B2 | 10/2006 | Gorokhov et al. | |
| 7,130,355 B1 | 10/2006 | Al-Dhahir et al. | |
| 7,480,497 B2* | 1/2009 | Biswas et al. | 455/168.1 |
| 7,526,042 B2* | 4/2009 | Yoshida | 375/285 |
| 2004/0005010 A1* | 1/2004 | He et al. | 375/260 |
| 2004/0131007 A1 | 7/2004 | Smee et al. | |
| 2004/0208267 A1* | 10/2004 | Lee | 375/354 |

(Continued)

FOREIGN PATENT DOCUMENTS

WO   2005/117377 A1   12/2005

(Continued)

OTHER PUBLICATIONS

Cai, Xiaodong et al. "Bounding Performance and Suppressing Intercarrier Interference in Wireless Mobile OFDM." IEEE Transactions on Communications, Dec. 2003, pp. 2047-2056, vol. 51, No. 12.

(Continued)

*Primary Examiner*—Chi H. Pham
*Assistant Examiner*—Shick Hom
(74) *Attorney, Agent, or Firm*—Coats & Bennet, P.L.L.C.

(57) ABSTRACT

Inter-carrier interference (ICI) cancellation in an OFDMA receiving signals from two transmitters is performed by identifying the transmitted sub-carriers that cause the largest ICI to sub-carriers received from other transmitters, and removing the ICI contribution from these sub-carriers. This may be accomplished by calculating the ICI terms only based on the interfering sub-carrier and the frequency offset. Alternatively, the transmissions causing the ICI are demodulated, the ICI on other signals is then determined and subtracted, and other signals are then demodulated. Which transmissions cause the largest ICI on others depends on the relative strength of the corresponding sub-carriers and how much orthogonality is lost. The latter might be due to frequency error, Doppler spread, or a combination of both.

16 Claims, 5 Drawing Sheets

U.S. PATENT DOCUMENTS

| | | | |
|---|---|---|---|
| 2005/0147176 A1 | 7/2005 | Yun et al. | |
| 2006/0029143 A1 | 2/2006 | Yoshida | |
| 2006/0159196 A1 | 7/2006 | Kwun et al. | |
| 2006/0239367 A1* | 10/2006 | Wilhelmsson et al. | 375/260 |
| 2007/0223359 A1* | 9/2007 | Li et al. | 370/203 |
| 2008/0144749 A1* | 6/2008 | Wilhelmsson et al. | 375/346 |

FOREIGN PATENT DOCUMENTS

| | | |
|---|---|---|
| WO | 2005/117379 A1 | 12/2005 |
| WO | 2006/111843 A1 | 10/2006 |

OTHER PUBLICATIONS

Chang, Kapseok et al. "Reduction of Doppler Effects in OFDM Systems." IEEE Transactions on Consumer Electronics, Nov. 2006, pp. 1159-1166, vol. 52, No. 4, ISSN: 0098-3063.

Kim, Sungsoo et al. "Robust OFDM in Fast Fading Channels." IEEE Global Telecommunications Conference, Globecom '03, Dec. 2003, pp. 1074-1078, vol. 2, ISBN: 0-7803-7974-8.

Kou, Y. J. et al. "An Iterative Intercarrier-Interference Reduction Algorithm for OFDM Systems." IEEE Pacific Rim Conf. Comm., Comp. and Signal Processing, Victoria, Aug. 2005, pp. 538-541.

Faulkner, Mike et al. "Low-Complex ICI Cancellation for Improving Doppler Performance in OFDM Systems." IEEE Proc. Vehicular Technology Conference, Sep. 25-28, 2006, 5 pages, Montreal, Canada.

"International Search Report," International Application No. PCT/EP2007/063933, May 19, 2008. European Patent Office, Rijswijk, Netherlands.

Nguyen et al., "Multi-User Interference Cancellation Scheme(s) for Multiple Carrier Frequency Offset Compensation in Uplink OFDMA." IEEE 17th International Symposium on Personal, Indoor and Mobile Radio Communications, 2006. Sep. 2006. pp. 1-5. XP-031023594. ISBN: 1-4244-0329-4. IEEE: Piscataway, NJ, USA.

Galda et al., "On the Effects of User Mobility on the Uplink of an OFDMA System." The 57th IEEE Semiannual Vehicular Technology Conference. Proceedings, vol. 4 of 4. Conf. 57, Apr. 22-25, 2003. pp. 1433-1437. XP-010862665. ISBN: 0-7803-7757-5. IEEE: Piscataway, NJ, USA.

Huang et al., "Iterative ICI Cancellation Algorithm for Uplink OFDMA System with Carrier-Frequency Offset." IEEE 62nd Vehiclular Technology Conference, 2005. Sep. 25-28, 2005. pp. 1613-1617. XP-010878717. ISBN: 0-7803-9152-7. IEEE: Piscataway, NJ, USA.

* cited by examiner

UPLINK INTER-CARRIER INTERFERENCE CANCELLATION OF OFDMA SYSTEMS

This application claims priority to provisional patent application Ser. No. 60/870,685, entitled ICI CANCELLATION FOR OFDMA SYSTEMS filed Dec. 19, 2006.

FIELD OF THE INVENTION

The present invention relates generally to wireless communications systems and in particular to a system and method for inter-carrier interference cancellation in an OFDMA uplink.

BACKGROUND

Orthogonal Frequency Division Multiplexing (OFDM) is a digital multi-carrier modulation scheme utilizing multiple closely-spaced, orthogonal sub-carriers. Each sub-carrier is modulated with a conventional modulation scheme (e.g., quadrature amplitude modulation) at a low symbol rate, maintaining data rates similar to conventional single-carrier modulation schemes in the same bandwidth. OFDM modulation provides economical, robust communications under poor channel conditions, such as narrowband interference and frequency-selective fading due to multipath propagation. The low symbol rate allows for the use of a guard interval between symbols, reducing inter-symbol interference. OFDM is deployed or planned for a variety of wireless litigation systems, including IEEE 802.16 (WiMAX), some IEEE 802.11a/g wireless LANs (Wi-Fi), IEEE 802.20 Mobile Broadband Wireless Access (MBWA), and the like.

One proposal for a new flexible wireless cellular communication system, which can be seen as an evolution of the 3G WCDMA standard, is 3G Long Term Evolution (3G LTE). This system will use OFDM as multiple access technique (called OFDMA) in the downlink and will be able to operate on bandwidths ranging from 1.25 MHz to 20 MHz. Furthermore, data rates up to, and even exceeding, 100 Mb/s will be supported for the largest bandwidth. For the uplink, a kind of pre-coded OFDM is employed, where the primary purpose of the pre-coding is to reduce the large peak-to-average (PAR) ratio commonly known to be one of the drawbacks with OFDM.

OFDM is uniquely suited for LTE for a number of reasons. Relatively low-complexity receivers, as compared to other access techniques, can be used in case of highly time-dispersive channels. Additionally, at least in theory, OFDM allows for very efficient usage of the available bandwidth. For example, in the case of only one user transmitting, it is possible to exploit the fact that the channel quality typically is very different at different frequencies (that is, the channel is said to be frequency selective). Also, since the information in OFDM is transmitted on a large number of sub-carriers, different modulation and coding can be applied on different sub-carriers, rather than using the same modulation and coding on all sub-carriers.

One of the main challenges of OFDM is to ensure that the sub-carriers are orthogonal to one another. This implies that, for example, frequency offset and phase noise must be maintained at a sufficiently low level. If the orthogonality is lost, information on one sub-carrier is leaked to other sub-carriers, primarily to the closest ones. This leakage is referred to as inter-carrier interference (ICI).

OFDMA allows several users to share the available bandwidth by allocating different sub-carriers to the different users, making the users orthogonal to one another. The allocation of sub-carriers may be dynamic, such as allocating a larger number of sub-carriers to users that have a larger amount of data to transmit. Unlike to the situation with a single user in OFDM, loss of orthogonality of the sub-carriers may be significant if the different users' signals are received with very different power, which may occur in the uplink or the downlink.

Two of the major factors giving rise to ICI are frequency error and Doppler spread. A frequency error is due to a mismatch between the transmitter and the receiver in generating the carrier frequency. A frequency error will also be manifest when the transmitter and the receiver would have identical frequency generators, but where one of the receiver or transmitter is moving relative to the other. For a multi-path channel, different paths will experience different Doppler frequency shifts, giving rise to a spread in the experienced Doppler frequency at the receiver side.

For OFDM, the ICI caused by a frequency error can be accurately modeled as:

$$I(\delta f) = \frac{\pi^2}{3}\left(\frac{\delta f}{\Delta f}\right)^2,$$

where $\delta f$ is the frequency error and $\Delta f$ is the carrier spacing between the sub-carriers. Since all the sub-carriers are affected by the same frequency offset, the frequency error may be removed prior to applying the FFT, to eliminate the ICI.

If instead the ICI is caused by Doppler spread, then if the paths are assumed to arrive from all directions with a uniform distribution (referred to as Jakes' model), the ICI can be accurately modeled as:

$$I(f_D) = \frac{\pi^2}{3}\left(\frac{f_D}{\Delta f}\right)^2,$$

where $f_D$ is the maximum Doppler frequency and $\Delta f$ is the carrier spacing between the sub-carriers.

If the ICI caused by a frequency error or Doppler spread is assumed to have the same effect as additive white Gaussian noise (AWGN), then the total noise experienced by a receiver is simply calculated as N+I, where N is power of the AWGN and I is the ICI power. Consequently, the effective signal-to-noise ratio (SNR) experienced by the system can be expressed as $$SNR_{eff} = \frac{S}{N+I}.$$

Using the effective SNR as defined above, it is easy to determine if ICI is an issue of not. It is also easily seen that the larger effective SNR that is required, the harder requirements there will be on keeping the ICI at a low level.

From these formulas, it is clear that a straightforward way to reduce the ICI is to increase the carrier spacing $\Delta f$. A known feature of OFDM is redundancy in the form of a cyclic prefix (CP) prepended to the useful part of each OFDM symbol of duration $T_u$. The minimum duration of the CP should be at least as long as the (expected) maximum delay spread of the channel where the system is supposed to operate. Since the carrier spacing is the reciprocal of $T_u$, increasing $\Delta f$ means that $T_u$ will be decreased, but the CP duration must be maintained. Accordingly, increasing $\Delta f$ results in reduced spectrum efficiency.

Another strategy to reduce ICI is to estimate the ICI and then remove its impact on the received signal. In general, ICI cancellation is a complex operation that adds cost and increases power consumption in an OFDM receiver. There are two major reasons for the complexity of ICI cancellation. First, from a mathematical perspective, removing the impact of ICI involves computing the inverse to a very large matrix, which is a computationally intensive task. Second, to estimate the ICI, both the channel and the channel derivative must be estimated. Since ICI reduces the effective SNR, accurate channel estimation cannot be performed, resulting in poor estimates of the ICI. An iterative approach to ICI cancellation has been suggested in the art, beginning with initial channel estimation and ICI cancellation. Following the initial ICI cancellation, improved channel estimates are obtained from the signals from which the initial ICI estimate has been removed. An improved ICI estimate is then obtained using the improved channel estimates. This iterative procedure may be repeated to obtain the desired performance improvement. Such iterative ICI estimation is computationally complex, and introduces delay.

One known scheme for ICI cancellation relies on subtracting the ICI from different sub-carriers, rather than attempting to invert a matrix. While this approach yields a significant gain improvement, especially if used together with windowing, it has been shown that the gain remains far from that ideally possible if the ICI could be fully removed, primarily because the channel estimate, and in particular the channel change, are difficult to estimate with sufficient accuracy. ICI cancellation schemes known in the art are complex, and although some yield considerable improvement, in general the improvement is far below what is theoretically possible.

Prior art OFDM ICI cancellation has only been considered when all the sub-carriers are transmitted by the same user. That is, a signal is sent from one transmitter, over a plurality of sub-carriers, and is received by a single receiver.

SUMMARY

According to one or more embodiments disclosed and claimed herein, a system and method is presented for ICI cancellation when a total received signal comprises signals transmitted by a plurality of transmitters. This methodology allows for very efficient solutions with low computational complexity, but that achieve ICI cancellation performance much closer to the ideal case than prior art solutions. ICI cancellation is performed by identifying the transmitted signals that cause the largest ICI to received signals from other transmitters, and removing the ICI contribution from these transmissions. This may be accomplished by calculating the ICI terms only based on the received signal and the frequency offset. Alternatively, the transmissions causing the ICI are demodulated, the ICI on other signals is then determined and subtracted, and other signals are then demodulated. Which transmissions cause the largest ICI on others depends on the relative strength of the corresponding signals and how much orthogonality is lost. The latter might be due to frequency error, Doppler spread, or a combination of both.

One embodiment relates to a method of cancelling ICI in an OFDMA wireless communication system receiver receiving signals from at least a first transmitter on a first set of sub-carriers and second transmitter on a second set of sub-carriers. A frequency offset in the sub-carrier received from the first transmitter is estimated. The ICI in the set of sub-carriers received from the second transmitter caused by the first transmitter is calculated based on the estimated frequency offset in the set of sub-carriers received from the first transmitter. The calculated ICI is subtracted from the set of sub-carriers received from the second transmitter.

Another embodiment relates to a method of receiving signals from two or more transmitters, each transmitting on one or more unique sub-carriers in an OFDMA wireless communication system. The received power level and the relative frequency offset of each received signal is estimated. The ICI each received sub-carrier causes on other received sub-carriers is estimated in response to its relative received power and frequency offset. The sub-carriers are serially demodulated in response to the ICI they cause other sub-carriers.

Still another embodiment relates to a receiver in an OFDMA wireless communication system. The receiver includes a receiver operative to receive signals from a plurality of transmitters, the signals carried on a plurality of sub-carriers, and to measure the received signal power levels. The receiver also includes a frequency estimation unit operative to estimate frequency offsets in received signals. The receiver further includes an ICI cancellation unit operative to estimate the ICI in a sub-carrier received from a second transmitter caused by a first transmitter in response to the frequency offset and relative power level of a sub-carrier received from a second transmitter, and further operative to cancel the estimated ICI from the sub-carrier received from the second transmitter.

DETAILED DESCRIPTION

Figure 1:
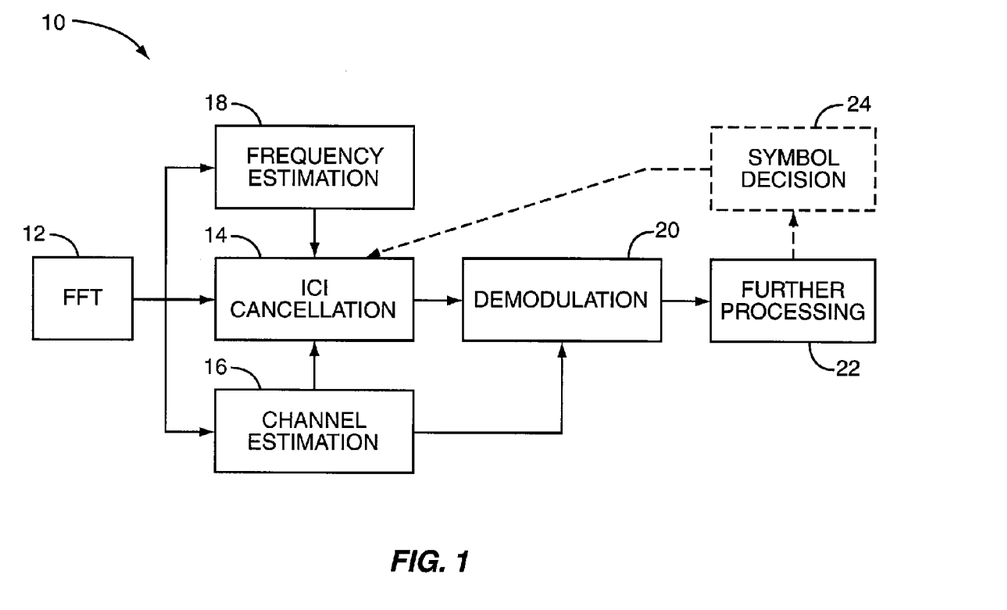
FIG. 1 is a functional block diagram of an OFDM receiver.

FIG. 1 depicts a functional block diagram of the relevant portion of an OFDM receiver 10. The receiver 10 includes a Fast Fourier Transform (FFT) 12, ICI Cancellation function 14, Channel Estimation function 16 providing channel estimates to the ICI Cancellation function 14, Frequency Estimation function 18 providing frequency estimates to the ICI Cancellation block 14, Demodulator function 20, and Further Processing 22 (such as soft value generation, FEC decoding, and the like). In some embodiments, the receiver 10 further includes a Symbol Decision function 24, which further aids ICI Cancellation 14 by providing decoded symbol information.

To simplify the description, the present invention is described for the up-link transmission in an OFDM system having 15 kHz sub-carrier spacing. Only two users transmitting to the base station are considered, with each user transmitting on a single resource block of 12 sub-carriers, corresponding to a bandwidth of 180 kHz. Those of skill in the art will readily recognize that the present invention is not limited to this specific configuration, but rather may be advantageously applied to ICI cancellation for any multi-user transmissions in an OFDM wireless communication system.

Figure 2:
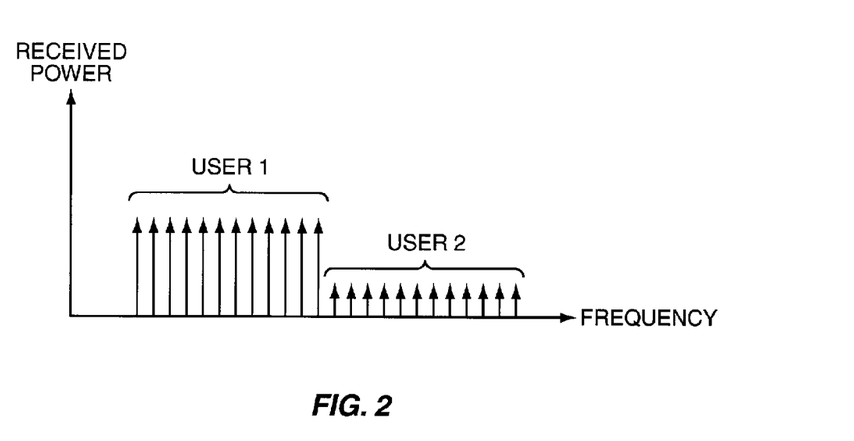
FIG. 2 is a graph depicting the received signal power of OFDM sub-carriers transmitted by two users.

FIG. 2 depicts the receipt of transmissions on sub-carriers from two users—user 1 and user 2. As depicted, the transmissions from user 1 are received at a considerably higher power level than those of user 2. Due to a relatively large frequency error in the signal transmitted from user 1, user 1's signals cause interference in the signals received from user 2. Since in general the received signal comes from different users, and therefore different sub-carriers of the signal may experience different frequency errors, no attempt is made in the base station to estimate and compensate for the frequency error prior to processing the signal by the FFT.

One potential source for a large frequency error in user 1's signal is that user 1 may be traveling at a high speed towards the base station. When user 1's mobile terminal is receiving, it will experience a positive frequency error due to the Doppler effect. Consequently, the mobile terminal will adjust its frequency so that it matches the true carrier frequency plus the Doppler frequency, and will demodulate received signals properly. Then, when the mobile terminal transmits, it will transmit at a carrier frequency that equals the correct carrier frequency plus the Doppler shift. Since the signal received at the base station (carrier frequency+Doppler) also will experience a positive Doppler shift due to user 1's relative speed, the frequency error experienced at the base station for user 1 will be twice the Doppler frequency.

Because the frequency error in the signal received from user 1 is twice the Doppler shift, it might cause a significant leakage in the FFT, wherein information on one sub-carrier leaks over to another sub-carrier. This leakage will degrade the performance for user 1, and in addition it may completely ruin reception performance for user 2 if the signal from user 1 is received at the base station at much higher power than the signal from user 2, as depicted in FIG. 2.

Numerically, suppose that user 1 is moving at 100 km/h and the carrier frequency is 2.6 GHz. This corresponds to a Doppler frequency shift of 240 Hz. The effective frequency error experienced at the base station will therefore be 480 Hz. Considering how this affects the performance for user 1, an upper bound on the ICI that user 1 causes to itself can be obtained by assuming an infinite number of sub-carriers being used, rather than just 12. The ICI bound obtained in this way becomes $$I(480) = \frac{\pi^2}{3}\left(\frac{480}{15000}\right)^2 = 0.0034 = -25 \text{ dB}.$$

Thus, if for instance the required SNR for user 1 is 15 dB, there would be a margin of 10 dB to the "noise-floor" caused by ICI, and the effect of ICI can safely be neglected.

Figure 3:
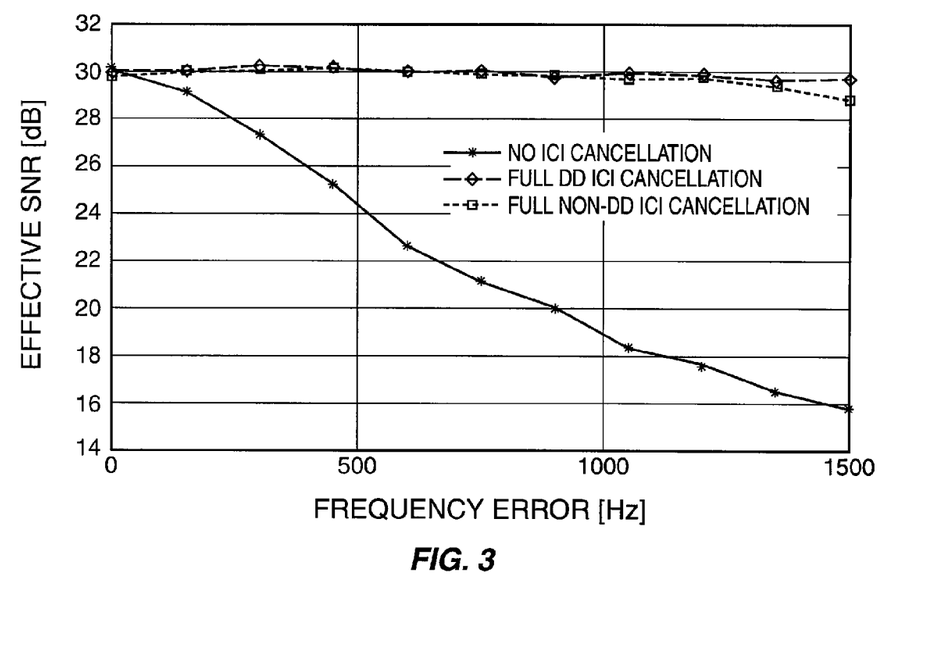
FIGS. 3 and 4 are graphs depicting the simulated effective SNR as a function of frequency error for different power offsets, with and without ICI cancellation.
Figure 4:
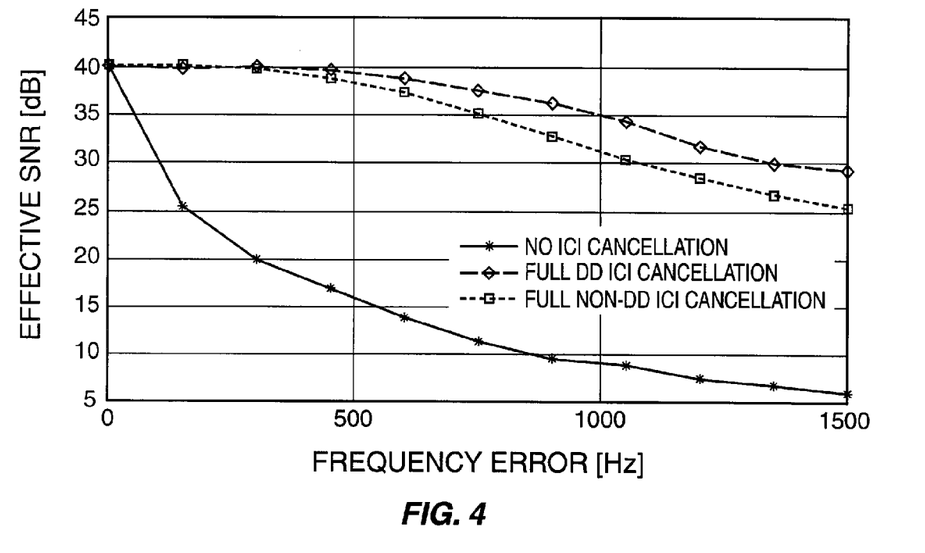
Figure 5:
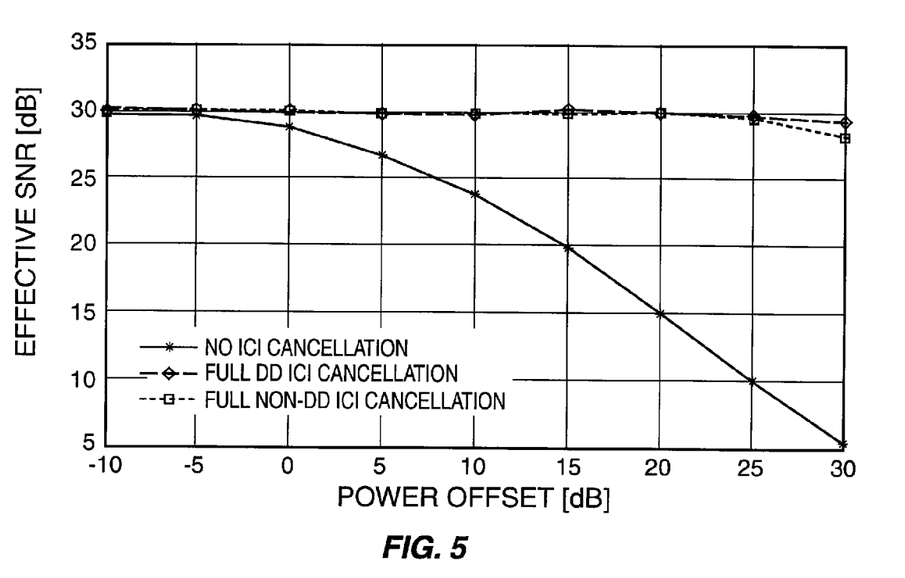
FIGS. 5 and 6 are graphs depicting the simulated effective SNR as a function of the power offset between users' signals for different frequency errors, with and without ICI cancellation.
Figure 6:
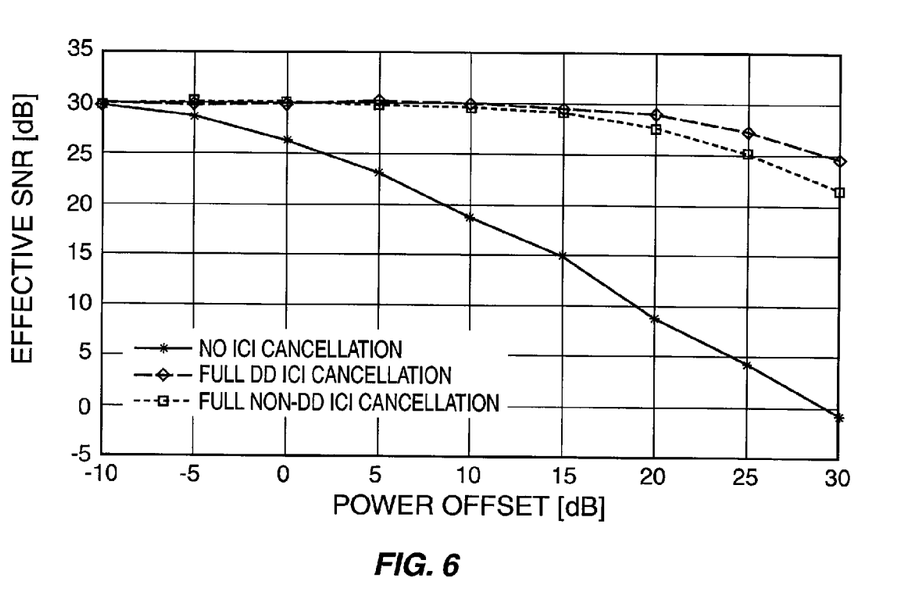

Next, consider the ICI that is caused from user 1 to user 2. Suppose that the signal from user 1 is received at higher power than the signal from user 2, as depicted in FIG. 2. This may occur, for example, if user 1 is much closer to the base station than user 2, and no power control is applied. FIG. 3 depicts the effective SNR for various frequency errors, where the S/N=30 dB and the signal from user 1 is received with 10 dB higher power. FIG. 4 depicts the effective SNR for various frequency errors, where the S/N=40 dB and the signal from user 1 is received with 20 dB higher power. FIG. 5 depicts the effective SNR for various power offsets between the received signals, where the S/N=30 dB and the signal from user 1 is received with a frequency error of 500 Hz. FIG. 6 depicts the effective SNR for various power offsets between the received signals, where the S/N=30 dB and the signal from user 1 is received with a frequency error of 1000 Hz. As shown, the degradation for user 2, with no ICI cancellation, is substantial.

FIGS. 3-6 also depict that ICI cancellation can drastically improve the effective SNR experienced by user 2, according to the following methodology. Suppose that user 1 is transmitting symbol $S_{K+L}$ on sub-carrier K+L, and let $H_{K+L}$ and $H'_{K+L}$ denote the (average) channel transfer function for sub-carrier K+L, and the change of $H_{K+L}$ during the information-carrying part of the OFDM symbol, respectively.

The corresponding received signal on sub-carrier K+L can be written $R_{K+L}=S_{K+L}H_{K+L}$, and the ICI that falls into sub-carrier K is approximately given by $$R_{K,K+L} = S_{K+L}H'_{K+L}\frac{1}{j2\pi L}.$$

Thus, to determine the ICI, the transmitted symbol as well as the channel's derivative must be estimated, which usually is very difficult. However, in the case that the experienced channel change is due to a frequency error we note that $$H'_{K+L} \approx j2\pi\delta f H_{K+L}/\Delta f$$

where the approximation comes from the fact that the channel change is assumed to be linear in the direction of the tangent, i.e., the approximation that is used is $$\exp(j2\pi\delta f/\Delta f) \approx 1 + j2\pi\delta f/\Delta f, \text{ when } \delta f \text{ is small.}$$

Since $R_{K+L}=S_{K+L}H_{K+L}$, it follows that $$R_{K,K+L} = S_{K+L}H'_{K+L}\frac{1}{j2\pi L}$$
$$\approx \frac{R_{K+L}}{H_{K+L}}j2\pi\frac{\delta f}{\Delta f}H_{K+L}\frac{1}{j2\pi L}$$
$$= R_{K+L}\frac{\delta f}{\Delta fL}.$$

Since $R_{K+L}$ is just the received symbol prior to equalization, and $\delta f$ is the frequency offset, which can be estimated with rather high accuracy, the ICI term can also be accurately estimated. This frequency estimation function is depicted as block 18 in the receiver 10 block diagram of FIG. 1. Note that the ICI is estimated by an estimate of the frequency error—neither the channel nor the derivative of the channel need to be estimated, as is usually the case in conventional approaches to ICI cancellation.

In the graphs of FIGS. 3-6, one ICI cancellation algorithm, denoted "Full non-DD ICI cancellation," uses the above expression for estimating the ICI component and then subtracts it from a received signal. The other algorithm, denoted "Full DD ICI cancellation," uses an actually transmitted signal and the actual channel experienced, thus reducing the noise term somewhat. DD stand for Decision Directed, and refers to the fact that in an actual implementation, the transmitted signal is not known, but must be determined. This is depicted by the dashed-line function Symbol Decision 24 in FIG. 2, which provides the ICI Cancellation 14 with what the receiver determines the transmitted symbol to have been. "Full" ICI cancellation refers to the fact that ICI from all sub-carriers transmitted by user 1 are subtracted from the signal from user 2.

Figure 7:
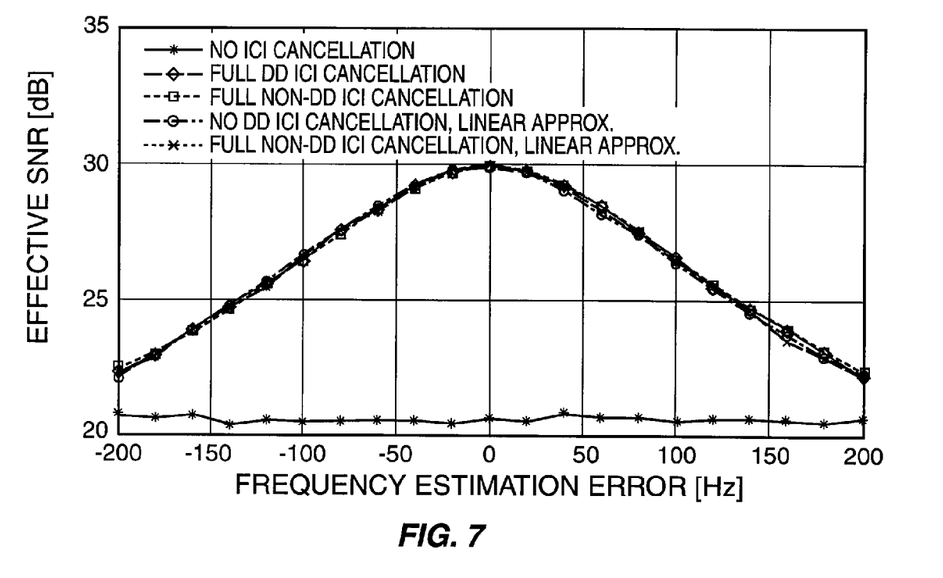
FIGS. 7 and 8 are graphs depicting the simulated effective SNR as a function of error in the estimation of frequency error, for different frequency errors.
Figure 8:
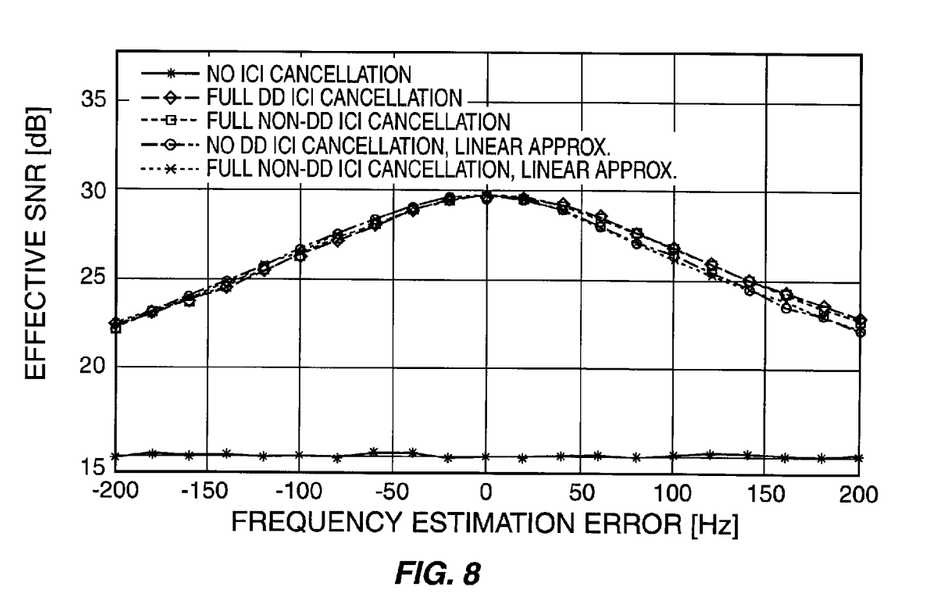

The results in FIGS. 3-6 are obtained under the assumption that the frequency error in the signal received from user 1 has been perfectly estimated. Of course, this is not the case in practice. FIGS. 7 and 8 depict the effective SNR of a received signal as function of estimation error for the frequency used to estimate the ICI. FIG. 7 depicts a 250 Hz frequency error; FIG. 8 depicts a 500 Hz error. In both cases, the S/N=30 dB and the signal from user 1 is received with 20 dB higher power. As expected, the effective SNR is degraded when the frequency error is not correctly estimated. The graphs additionally demonstrate that even when the frequency estimation error is relatively large, the gain is still significant compared to the case where no ICI cancellation is performed.

Figure 9:
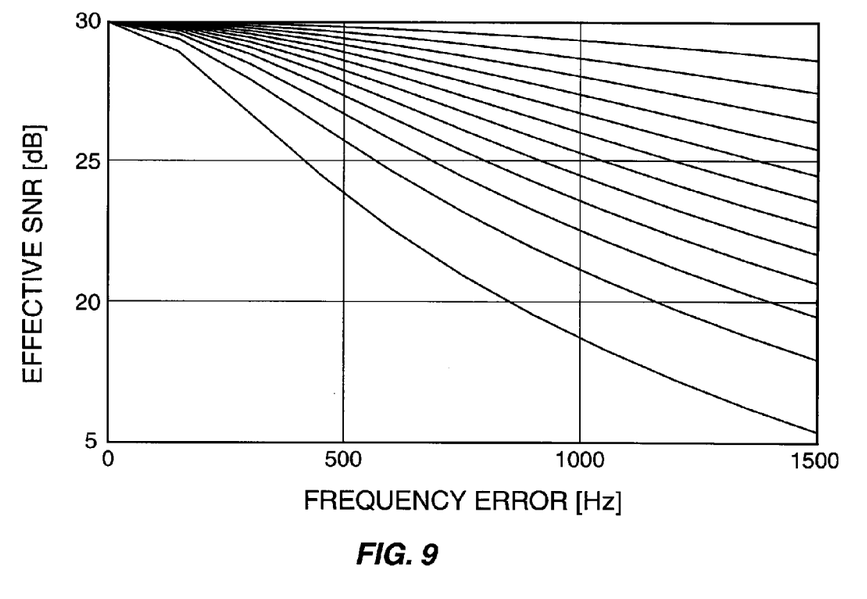
FIGS. 9 and 10 are graphs depicting the calculated effective SNR as a function of frequency error when ICI is cancelled from increasing number of sub-carriers, for different received signal powers.
Figure 10:
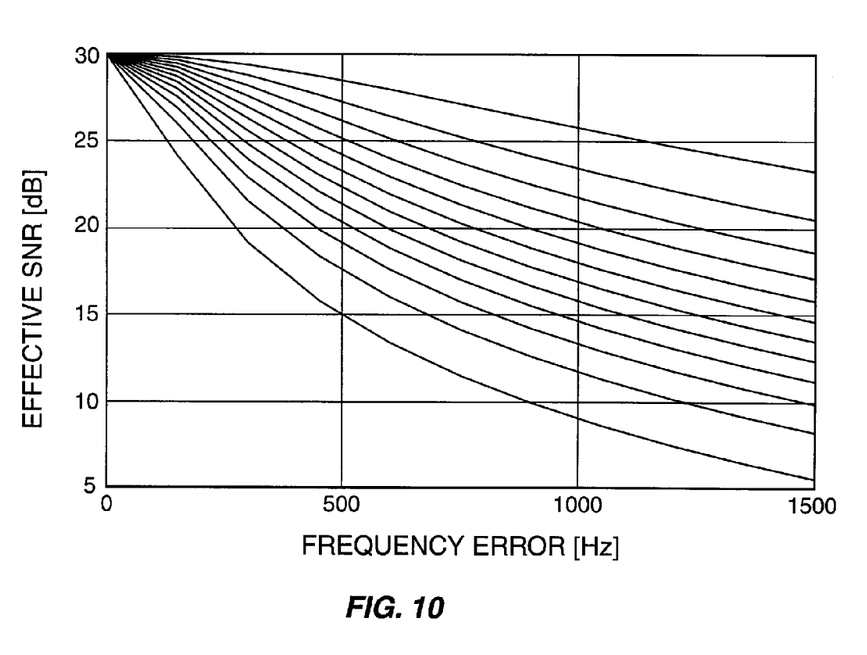

FIGS. 9 and 10 graph the calculated effective SNR as a function of frequency error for ICI cancellation from different numbers of sub-carriers, and depict how the receiver performance varies depending on the number of sub-carriers transmitted by user 1 for which the corresponding ICI in user 2's signal is cancelled. Data graphed in the figures was obtained analytically. In FIG. 9, the signal from user 1 is received with 10 dB higher power than the signal from user 2; in FIG. 10, the user 1 signal is 20 dB higher. S/N=30 dB in both cases. The lower curve corresponds to L=0, meaning that no ICI cancellation is performed. The next curve graphs L=1, wherein only ICI from the user 1 sub-carrier closest (in frequency) to user 2's signal is cancelled. L=2 means that ICI from the two closest user 1 sub-carriers are cancelled, and so on. For L=12, full cancellation is performed, meaning that the ICI from all user 1 sub-carriers are cancelled from the signal from user 2. In FIGS. 9 and 10, this curve is hard to see since it is perfectly horizontal—indicating no SNR degradation due to ICI over 1500 Hz of frequency error in user 1's received signal.

As FIGS. 9 and 10 demonstrate, the ICI cancellation methodology of the present invention is scalable. For relatively slight interference, only ICI contributed by the closest interfering sub-carriers from user 1 may be removed from a sub-carrier received from user 2 to achieve an acceptable SNR. For more severe interference, ICI contributed by most or all of the interfering sub-carriers may need to be removed. Additionally, ICI from a variable number of the interfering sub-carriers from user 1 may need to be cancelled from other, further (in frequency) sub-carriers from user 2. That is, while ICI from most or all user 1 sub-carriers may need to be calculated and removed from adjacent user 2 sub-carriers, user 2 sub-carriers further removed may require ICI cancellation from fewer of user 1's sub-carriers (e.g., only the closest few).

Given the teachings herein, those of skill in the art may readily perform the tradeoffs between computational complexity, power consumption for ICI cancellation calculations, receiver delay, and achievable SNR improvement for any given situation. Such determination may, for example, be based on the degree of frequency error in an interfering signal and the relative received power between interfering and interfered signals. In any event, calculating and removing ICI caused by one or more individual sub-carriers transmitted by a first transmitter on a received signal transmitted from a second transmitter may achieve greater ICI cancellation than prior art methods, at reduced computational complexity.

As those of skill in the art will readily recognize, any or all of the functional blocks depicted in FIG. 1–including the FFT 12, ICI Cancellation 14, Channel Estimation 16, Demodulator 20, Further Processing 22, Frequency Estimation 18, and Symbol Decision 24—may, in any receiver 10, be implemented as hardware circuits, as programmable logic, as firmware or software executing on a microprocessor or Digital Signal Processor (DSP), or any combination thereof. Although the present invention has been explicated herein in terms of two users transmitting via mobile terminals to a base station, the invention is not limited to this system implementation, and may be advantageously applied to any OFDMA receiver that receives signals from two or more transmitters on two or more sub-carriers.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of cancelling inter-carrier interference (ICI) in an orthogonal frequency division multiple access (OFDMA) wireless communication system receiver receiving signals from at least a first transmitter on a first set of sub-carriers and second transmitter on a second set of sub-carriers, comprising:

estimating a frequency offset in the set of sub-carriers received from the first transmitter;

calculating the ICI in the set of sub-carriers received from the second transmitter caused by the first transmitter based on the estimated frequency offset in the set of sub-carriers received from the first transmitter; and subtracting the calculated ICI from the set of sub-carriers received from the second transmitter.

2. The method of claim 1 wherein calculating the ICI in the set of sub-carriers received from the second transmitter caused by the first transmitter further comprises approximating the ICI in the second set of sub-carriers caused by each of the sub-carriers from the first transmitter as $$R_{K,K+L} = R_{K+L} \frac{\delta f}{\Delta f L} \text{ where}$$

$R_{K,K+L}$ is the ICI in sub-carrier K caused by a signal on sub-carrier K+L;

$\delta f$ is the estimated frequency offset in the sub-carrier received from the first transmitter;

$\Delta f$ is the sub-carrier spacing; and

L is the distance in number of sub-carriers between the interfered and the interfering sub-carriers, such that L=+/−1 denotes adjacent sub-carriers.

3. The method of claim 2 wherein the number of sub-carriers from the first transmitter and which sub-carriers from the first transmitter are considered in calculating ICI terms for the set of sub-carriers received from the second transmitter are determined based on the frequency offset of the sub-carriers from the first transmitter.

4. The method of claim 2 wherein the number of sub-carriers from the first transmitter and which sub-carriers from the first transmitter are considered in calculating ICI terms for the set of sub-carriers received from the second transmitter are determined based on the received power offset of the sub-carriers from the first transmitter compared to the sub-carriers received from the second transmitter.

5. The method of claim 2 wherein the number of sub-carriers from the first transmitter and which sub-carriers from the first transmitter are considered in calculating ICI terms for the set of sub-carriers received from the second transmitter are determined based on the required receiver performance for signals transmitted on the sub-carrier received from the second transmitter.

6. The method of claim 2 wherein ICI terms are calculated for the interference from each of the sub-carriers from the first transmitter.

7. A method of receiving signals from two or more transmitters, each transmitting on one or more unique sub-carriers in an orthogonal frequency division multiple access (OFDMA) wireless communication system, comprising:

estimating the received power level of each received signal;

estimating the relative frequency offset of each received signal;

estimating the inter-carrier interference (ICI) each received sub-carrier causes on other received sub-carriers in response to its relative received power and frequency offset; and serially demodulating the sub-carriers in response to the ICI they cause other sub-carriers.

8. The method of claim 7 wherein estimating the ICI comprises adaptively estimating the ICI using a method having the minimum computational complexity to achieve a predetermined level of ICI cancellation.

9. A receiver in an orthogonal frequency division multiple access (OFDMA) wireless communication system, comprising:

a receiver operative to receive signals from a plurality of transmitters, the signals carried on a plurality of sub-carriers, and to measure the received signal power levels;

a frequency estimation unit operative to estimate frequency offsets in received signals;

an inter-carrier interference (ICI) cancellation unit operative to estimate the ICI in a sub-carrier received from a second transmitter caused by a first transmitter in response to the frequency offset and relative power level of a sub-carrier received from a second transmitter, and further operative to cancel the estimated ICI from the sub-carrier received from the second transmitter.

10. The receiver of claim 9, wherein the ICI cancellation unit estimates ICI as $$R_{K,K+L} = R_{K+L} \frac{\delta f}{\Delta f L} \text{ where}$$

$R_{K,K+L}$ the ICI in sub-carrier K caused by a signal on sub-carrier K+L;

$\delta f$ is the estimated frequency offset in the sub-carrier received from the first transmitter;

$\Delta f$ is the sub-carrier spacing; and

L is the distance in number of sub-carriers between the interfered and the interfering sub-carriers, such that L=+/−1 denotes adjacent sub-carriers.

11. The receiver of claim 9 wherein the number of sub-carriers from the first transmitter and which sub-carriers from the first transmitter are considered in calculating ICI terms for the sub-carrier received from the second transmitter are determined based on the frequency offset of the sub-carriers from the first transmitter.

12. The receiver of claim 11 wherein the number of sub-carriers from the first transmitter and which sub-carriers from the first transmitter are considered in calculating ICI terms for the sub-carrier received from the second transmitter are determined based on the received power offset of the sub-carriers from the first transmitter compared to the sub-carrier received from the second transmitter.

13. The receiver of claim 11 wherein the number of sub-carriers from the first transmitter and which sub-carriers from the first transmitter are considered in calculating ICI terms for the sub-carrier received from the second transmitter are determined based on the required receiver performance for signals transmitted on the sub-carrier received from the second transmitter.

14. The receiver of claim 11 wherein ICI terms are calculated for the interference from each of the plurality of sub-carriers from the first transmitter.

15. The receiver of claim 10 wherein the ICI cancellation unit is further operative to successively cancel the ICI in a plurality of received signals, wherein the order of ICI cancellation is determined by estimating the degree of ICI each received signal causes in other received signals.

16. The receiver of claim 15 wherein ICI is first cancelled from the received signals causing the most ICI in other received signals.

* * * * *

UNITED STATES PATENT AND TRADEMARK OFFICE
CERTIFICATE OF CORRECTION

PATENT NO. : 7,787,358 B2
APPLICATION NO. : 11/844072
DATED : August 31, 2010
INVENTOR(S) : Wilhelmsson et al.

Page 1 of 1

It is certified that error appears in the above-identified patent and that said Letters Patent is hereby corrected as shown below:

On the Title Page, Item (54) in Title, Line 2, delete "OF" and insert -- FOR --, therefor.

On the Title Page, Item (74), under "Attorney, Agent, or Firm", Line 1, delete "Bennet," and insert -- Bennett, --, therefor.

In Column 1, Line 2, delete "OF" and insert -- FOR --, therefor.

In Column 2, Lines 37-38, delete " $I(f_D) = \frac{\pi^2}{3}\left(\frac{f_D}{\Delta f}\right)^2$ " and insert -- $I(f_D) = \frac{\pi^2}{6}\left(\frac{f_D}{\Delta f}\right)^2$, --, therefor.

Signed and Sealed this
Twenty-fifth Day of January, 2011

David J. Kappos
*Director of the United States Patent and Trademark Office*